United States Patent [19]

Carmi et al.

[11] Patent Number: 4,461,140
[45] Date of Patent: Jul. 24, 1984

[54] SPINDEL MOISTENER ASSEMBLY AND MOISTENER MEMBERS USED IN SUCH ASSEMBLIES FOR COTTON PICKERS

[75] Inventors: Mordechay Carmi; Benjamin Nur; Tzipora Tesler, all of Ramat Hakovesh, Israel

[73] Assignee: Duram Rubber Products, Ramat Hakovesh, Israel

[21] Appl. No.: 415,924

[22] Filed: Sep. 8, 1982

[30] Foreign Application Priority Data

Mar. 5, 1982 [IL] Israel ......................................... 65174

[51] Int. Cl.³ ............................................. A01D 46/16
[52] U.S. Cl. ............................................ 56/50; 56/41
[58] Field of Search ......................... 56/41, 44, 50, 400

[56] References Cited

U.S. PATENT DOCUMENTS

| | | | |
|---|---|---|---|
| 1,780,748 | 11/1930 | Fisher | 56/400 |
| 2,369,708 | 4/1945 | Baker et al. | 56/41 |
| 2,876,611 | 3/1959 | Hubbard | 56/41 |
| 2,884,754 | 5/1959 | Bornzin et al. | 56/41 |
| 2,930,177 | 3/1960 | Hubbard | 56/41 |
| 3,004,376 | 10/1961 | Hubbard | 56/41 |
| 3,066,467 | 12/1962 | Barfield | 56/44 |
| 3,411,278 | 11/1968 | Grant | 56/41 |
| 3,491,725 | 1/1970 | Maniscalco | 56/400 |

*Primary Examiner*—Paul J. Hirsch
*Attorney, Agent, or Firm*—Benjamin J. Barish

[57] ABSTRACT

A spindle moistener assembly for a cotton picker which assembly includes a plurality moistener members mounted in cantilever fashion to an elongated support with each moistener member including a mounting arm at one end secured to the support and a moistener pad at the opposite end disposed to be engaged by the picker spindles for moistening same during the rotation of the picker drum. Each moistener member is constituted of a unitary body of resilient material integrally formed at one end with the mounting arm and at the opposite end with the moistener pad.

15 Claims, 5 Drawing Figures

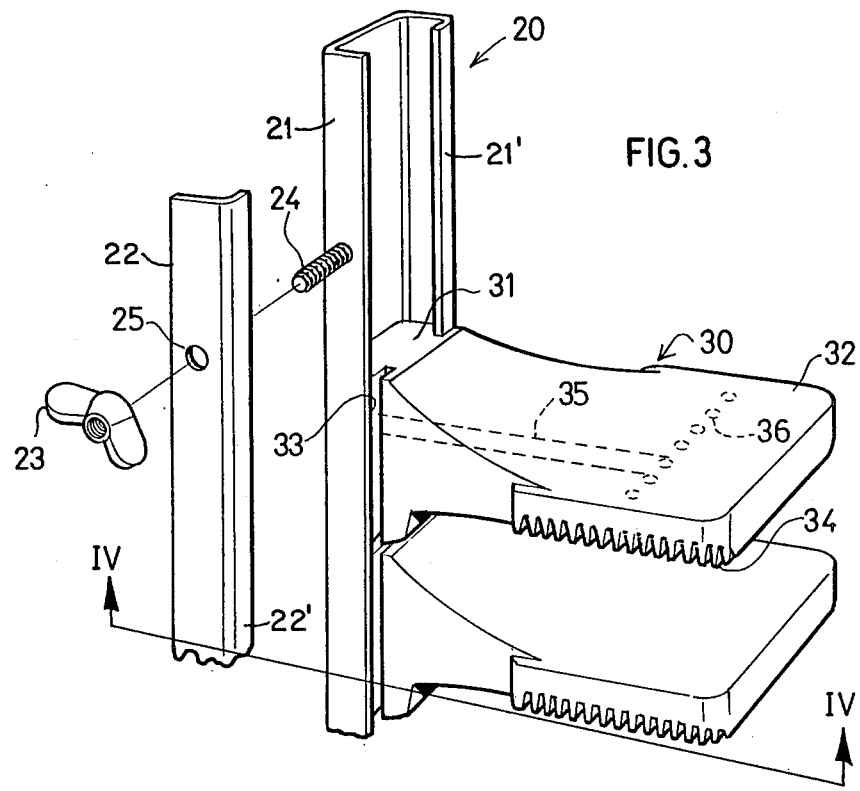
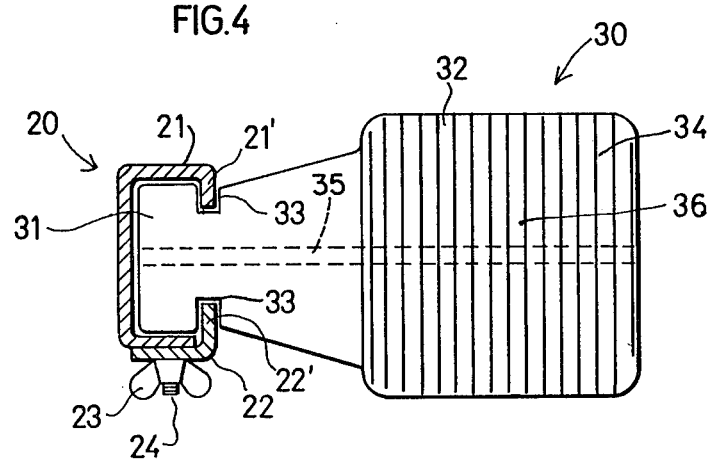

SPINDEL MOISTENER ASSEMBLY AND MOISTENER MEMBERS USED IN SUCH ASSEMBLIES FOR COTTON PICKERS

BACKGROUND OF THE INVENTION

The present invention relates to spindle moistener assemblies for cotton pickers, particularly of the type including a rotary-picker drum carrying a plurality of picker spindles adapted to be moistened by the moistener assembly. The invention also relates to moistener members used in such assemblies.

Many types of cotton pickers are known, one example being International Harvester Cotton Picker Series 500. Such cotton pickers include one or more rotary drums carrying a plurality of picker spindles which are rotated first through a moistening station wherein the spindles are moistened by the spindle moistener assembly, and then through a pick-off station wherein a doffer assembly removes the cotton from these spindles. The moistener assembly in such cotton pickers includes a plurality of moistener members mounted in cantilever fashion to an elongated support, each of the moistening members including a mounting arm, usually of aluminum, secured to the support, and a moistening pad removably received on the mounting arm and disposed so as to be engaged by the picker spindles for moistening them during the rotation of the picker drum.

We have noted a number of drawbacks in the commercially available cotton pickers wherein the mounting arm is of aluminum or other rigid material, and the moistener pad is removably received on the mounting arm. One serious drawback is that the aluminum arm tends to break when impacted by rigid materials, such as stones or rocks, or when jammed by an accumulation of cotton, both of which are commonly encountered during the operation of the cotton picker. Another drawback is that the moistener pad tends to fall-off the mounting arm when impacted by stones or rocks, particularly if a portion of the mounting arm has already broken off. A further drawback is the difficulty in removing the moistener members from the assembly in order to repair or replace the mounting arm or the moistening pad. Because of the foregoing drawbacks, such cotton pickers usually experience a considerable down-time period for repair purposes. This not only increases the expense of operation and maintenance of such pickers, but also can cause considerable difficulty during the cotton-harvesting period, by delaying the completion of the harvest and thereby subjecting the cotton crop to the risk of damage by early rainfall.

An object of the present invention is to provide a spindle moistener assembly for a cotton picker of this type, which moistener assembly has improvements in some or all of the above respects. Another object of the invention is to provide a moistener member particularly useful in the new moistener assembly.

SUMMARY OF THE INVENTION

According to one broad aspect of the present invention, there is provided a spindle moistener assembly for a cotton picker of the type including a rotary drum carrying a plurality of picker spindles adapted to be moistened by the moistener assembly which includes a plurality of moistener members mounted in cantilever fashion to an elongated support with each moistener member including a mounting arm at one end secured to the support and a moistener pad at the opposite end disposed to be engaged by the picker spindles for moistening same during the rotation of the picker drum, characterized in that both the mounting arm and the moistener pad of each moistener member are constituted of resilient material permitting flexing thereof when engaged by said picker spindles.

Preferably, each of the moistener members is constituted of a unitary body of resilient material integrally formed at one end with the mounting arm and at the opposite end with the moistener pad. Especially good results are obtained when each is made of natural or synthetic elastomeric material.

According to a further aspect of the invention, the mounting arm of each of the moistener members is formed with a pair of recesses on its opposite side faces, said elongated support including a pair of flanges on its opposite sides receivable in said recesses for securing a plurality of the moistener members to the support in spaced parallel relationship therealong. In addition, the elongated support includes a first profile member formed at one side with one of said flanges, and a second profile member formed at one side with the other of said flanges, said second profile member being removably secured to said first profile member to permit convenient attachment and removal of the plurality of moistener members to said elongated support.

According to further aspects of the invention, there is provided a moistening member having the foregoing characteristics for use in a moistener assembly of a cotton picker.

Moistener assemblies, and moistener members for use in such assemblies, constructed in accordance with the foregoing features have been found to provide a number of important advantages over the conventional construction. Thus, one important advantage is that the breakage of the mounting arm, or the falling-off of the moistener pad, are both substantially reduced or entirely eliminated since both the mounting arm and the moistener pad flex upon engagement with solid objects such as rocks or stones. In addition, the arrangement for attaching each moistener member to the elongated support greatly simplifies the initial attachment of the moistener members to the moistener assembly, and also simplifies their removal and reattachment for cleaning, repair or maintenance purposes whenever required. Both of the foregoing advantages have been found to very substantially reduce the down-time of a cotton picker, and to thereby enable the cotton crop to be harvested in a minimum of time. As described above, a minimum of downtime is of particular importance where a harvest is threatened by rain as in Israel.

Further features and advantages of the invention will be apparent from the description below.

BRIEF DESCRIPTION OF THE DRAWINGS

The invention is herein described, by way of example only, with reference to the accompanying drawings, wherein:

FIG. 3 is an enlarged three-dimensional view illustrating a part of the moistener assembly of FIG. 2;

FIG. 4 is a sectional view along lines IV—IV of FIG. 3; and

DESCRIPTION OF A PREFERRED EMBODIMENT

Figure 1:
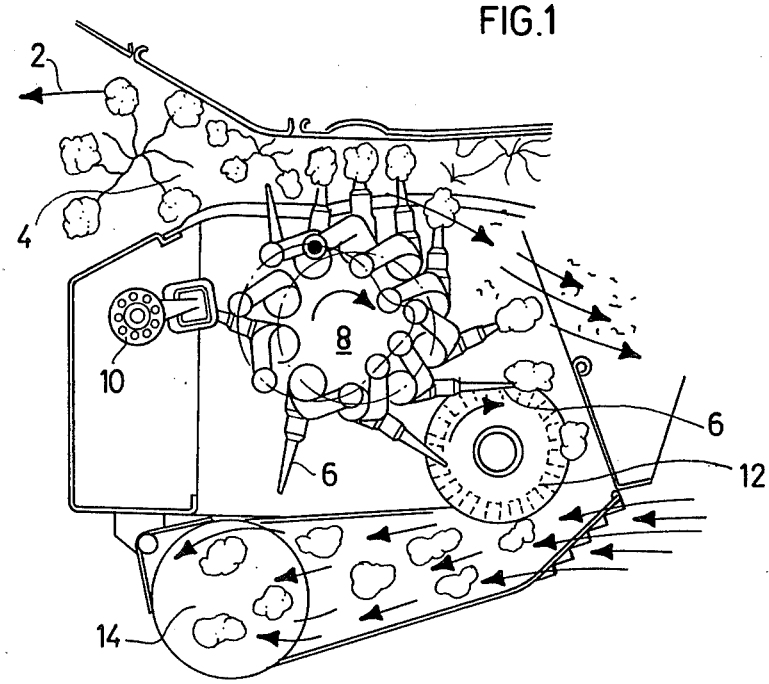
FIG. 1 is a diagram illustrating, from the top, one form of cotton picker in which the invention is particularly useful, particularly showing the location of the moistener assembly of the present invention.

With reference first to FIG. 1, there is diagrammatically illustrated from the top, a cotton picker of the above-mentioned type in which the invention is particularly useful. Such a cotton picker is adapted to be driven by tractor in the direction of arrow 2, so as to intercept the cotton in a picking zone 4. The cotton picker includes a plurality of picker spindles 6 carried by a drum 8 which is rotated, clockwise in the illustrated example. The spindles 6 are also rotated on their longitudinal axes so as to pick-up the cotton within the picking zone 4. Before the spindles 6 arrive into the picking zone 4, however, they first pass through a moistening zone occupied by the spindle moistener assembly 10, wherein each spindle is moistened by water to better enable it to pick-up the cotton in the picking zone 4. Further rotation of drum 8 brings the spindles 6, and the cotton picked-up thereby, to a doffer assembly 12, whereat the cotton is removed from the spindles and fed via tube 14 to a storage zone. Drum 8 then brings the spindles, free ("doffed") of the cotton, back to the spindle moistener assembly 10 for remoistening before passing again through the picking zone 4 for picking-up additional cotton.

Such cotton pickers are well known, and therefore further details of the construction and operation of these machines are not described herein. However, it might merely be pointed out that, whereas FIG. 1 illustrates only one picker drum 8 including the moistener assembly 10 and doffer assembly 12 associated therewith, the commercial cotton pickers usually include two or more of such picker drums and corresponding moistener and doffer assemblies.

The present invention is concerned primarily with the spindle moistener assembly 10 of FIG. 1, and also with the moistener member included in such an assembly.

Figure 2:
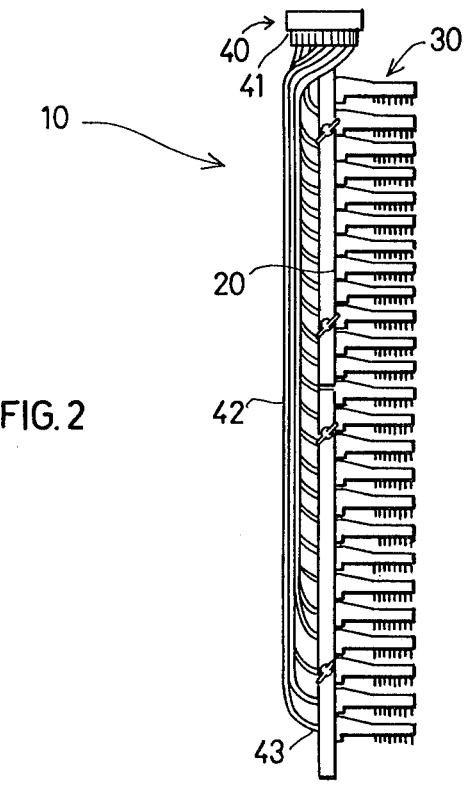
FIG. 2 is a side elevational view illustrating one form of moistener assembly constructed in accordance with the present invention.

As shown in FIG. 2, the spindle moistener assembly 10 includes three main components, namely: an elongated support or mounting frame, generally designated 20; a plurality of moistener members, each generally designated 30, mounted in cantilever fashion and in spaced relationship along the length of the elongated support 20; and liquid conduit means, generally designated 40, for conveying a moistener liquid, such as water, individually to each of the moistener members 30.

The construction of the elongated support 20 and the individual moistener pads 30 is best seen in FIGS. 3 and 4.

Thus, with respect to the elongated support 20, it will be seen that it is constituted of two profile members 21 and 22, removably secured together by fasteners 23, such as butterfly nuts. The latter nuts are all threaded onto bolts 24 fixed to profile member 21, the other profile member 22 being formed with openings 25 for receiving the bolts. Profile member 21 is of substantially C-shape in section but includes a flange 21' formed at one end. The second profile member 22 is of substantially L-shape in section, one of its legs 22' constituting a second flange facing flange 21' of profile member 21.

Flanges 21' and 22' of the elongated support 20 are adapted to be received within recesses formed in the side faces of the moistener members 30 for clamping these members in place, as will be described more particularly below. Preferably, the C-shaped profile member 21 is constituted of a single continuous strip whereas the L-shaped profile member 22 is divided into sections (two sections being illustrated in FIG. 2), each section being secured to profile member 21 by the butterfly nuts 23 so as to permit convenient attachment and removal of the moistener members 30.

Each of the moistener members 30 is formed as a unitary body of resilient material, preferably of molded elastomeric material such as natural or synthetic rubber. Each member includes a mounting arm 31 at one end, and a moistener pad 32 at the opposite end.

With respect to mounting-arm end 31 of the moistener member 30, it will be seen from FIGS. 3 and 4 that the side faces of this end are formed with opposed recesses 33. These are the recesses which receive the flanges 21', 22' of the elongated support 20 as described above.

The moistener-pad 32 end of each mounting member 30 is formed, on its underface, with a plurality of ribs 34 extending transversely of the moistener member. These ribs are engaged by the spindles 6, carried by the picker drum 8 in FIG. 1, which spindles are moistened by water fed to ribs 34 via a longitudinal bore or passageway 35 formed through the moistener member 30, and terminating in a plurality of openings 36 extending longitudinally across the moistener pad 32 and open at the underface to the pad.

As shown particularly in FIG. 3, the upper and lower faces of the mounting arm 31 portion of each moistener member 30 are substantially flat. Thus, the flat face of one moistener member 30 is adapted to abut against the flat face of the next one, so that when a plurality of the moistener members are secured to the elongated support as described above, all the moistener members are mounted in cantilever fashion with the mounting arm of each aiding in supporting the next moistener member, and with the moistener pad of each spaced from the moistener pad of the next member.

The assembly 40 for conducting water to the moistener members 30 comprises an annular coupling 41 coupling one end of a plurality of tubes 42 to a water supply pipe (not shown), the opposite ends of the tubes 42 being coupled to the passageways 35 and openings 36 of the respective moistener members 30.

Since each moistener member 30 is made of resilient or elastomeric material, the mounting arm 31, as well as the mounting pad 32 of each member, will tend to flex upon engagement with a rigid object, such as a stone or rock, thereby substantially reducing the possibility of breaking the mounting arm or of accidentally removing the moistener pad. In the arrangement illustrated in FIGS. 3 and 4, the upper face of the mounting arm 31 of each moistener member 30 is inwardly tapered to provide a reduced-thickness juncture with the moistener pad 32, in order to enhance the flexibility of the moistener member in case of engagement with a rigid object.

It will be seen that the illustrated embodiment of the invention accomplishes the above-described objects, in that the unitary construction of the moistener members 30 of elastomeric material substantially reduces, or entirely eliminates, the possibility of breakage of the moistener member, or of accidental removal of the moistener pad thereof, commonly encountered in the conventional machines. In addition, the illustrated construction of the moistener members, as well as the construction of the support structure 20, permits the convenient and quick attachment and removal of the moistener members 30 for cleaning or maintenance purposes, or for repair or replacement purposes should one of the moistener members 30 break or be otherwise damaged.

Figure 5:
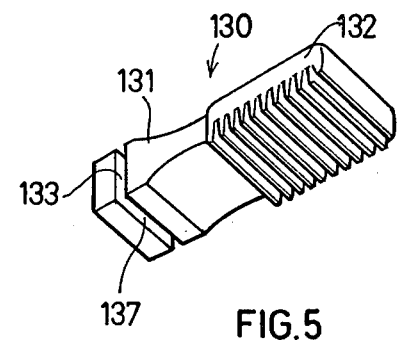
FIG. 5 is a three-dimensional view illustrating a variation in the construction of the moistener member.

FIG. 5 illustrates a modification in the construction of the moistener member, therein designated 130, wherein the mounting arm 131 is formed, not only with the opposed side recesses 133 for receiving the flanges (21', 22') of the support 20, but also with opposed recesses 137 on its upper and lower faces (only the lower face being seen in FIG. 5). Such a construction may be used when the support 20 is provided also with transversely-extending flanges for more securely gripping the mounting arms 131 of the moistener member 130.

In most cases the relatively thick mounting end of the moistener arms (31, 131) will be sufficient to maintain each moistener member (30, 131) in its required spatial relationship with respect to the picker spindles 6 carried by the rotary drum 8. However, in some cases it may be desired to provide the support 20 with rigid partition elements for precisely fixing the position of each of the moistener members 30.

While the invention has been described with respect to one preferred embodiment, it will be appreciated that many other variations, modifications and applications of the invention may be made.

What is claimed is:

1. A spindle moistener assembly for a cotton picker of the type including a rotary picker drum carrying a plurality of picker spindles adapted to be moistened by the moistener assembly which includes a plurality of moistener members mounted in cantilever fashion to an elongated support with each moistener member including a mounting arm at one end secured to the support and a moistener pad at the opposite end disposed to be engaged by the picker spindles for moistening same during the rotation of the picker drum, characterized in that both the mounting arm and the moistener pad of each moistener member are constituted of resilient material permitting flexing thereof when engaged by said picker spindles wherein each of said moistener members is constituted of a unitary body of resilient materials integrally formed at one end with the mounting arm and at the opposite end with the moistener pad.

2. An assembly according to claim 1, wherein said resilient material is natural or synthetic elastomeric material 3. An assembly according to claim 1, wherein said mounting arm of each of said moistener members is formed with a pair of recesses on its opposite side faces, said elongated support including a pair of flanges on its opposite sides receivable in said recesses for securing a plurality of the moistener members to the support in spaced parallel relationship therealong.

4. The assembly according to claim 3, wherein said elongated support includes a first profile member formed at one side with one of said flanges, and a second profile member formed at one side with the other of said flanges, said second profile member being removably secured to said first profile member to permit convenient attachment and removal of the plurality of moistener members to said elongated support.

5. The assembly according to claim 4, wherein said first profile member is substantially of C-shape in section with said one flange extending inwardly from one side thereof, and wherein said second profile member is substantially of L-shape in section with one side thereof constituting said other flange.

6. The assembly according to claim 3, wherein the mounting arm of each moistener member is of reduced thickness towards the moistener pad end thereof to enhance the flexibility of the mounting arm and moistener pad upon engagement of the latter by the picker spindles.

7. The assembly according to claim 6, wherein the mounting arm of each moistener member is formed with a gradually tapering upper face it its juncture with the moistener pad end thereof.

8. The assembly according to claim 6, wherein the mounting arm of each moistener member is formed with recesses also on the upper and lower faces thereof.

9. The assembly according to claim 7,
wherein each of said unitary moistener members is formed with a plurality of ribs on its underface defining said moistener pad end thereof, and with a liquid passageway leading through the mounting arm to said ribbed underface for conducting the moistening liquid thereto.

10. A moistener member particularly useful for a spindle moistener assembly in a cotton picker of the type including a rotary-picker drum carrying a plurality of picker spindles adapted to be moistened by the moistener assembly, which moistener assembly includes a plurality of moistener members mounted in cantilever fashion to an elongated support with each moistener member including a mounting arm at one end secured to the support and a moistener pad at the opposite end disposed to be engaged by the picker spindle for moistening same during rotation of the picker drum, characterized in that both the mounting arm and the moistener pad are constituted of resilient material permitting flexing thereof when engaged by the picker spindles wherein said moistener member is constituted of a unitary body of resilient material integrally formed at one end with said mounting arm and at the opposite end with said moistener pad.

11. A moistener member according to claim 10, wherein said resilient material is natural or synthetic elastomeric material.

12. A moistener member according to claim 10,
wherein said mounting arm is of reduced thickness towards the moistener pad end thereof to enhance the flexibility of the mounting arm and moistener pad upon engagement of the latter by the picker spindles.

13. A moistener member according to claim 12, wherein said mounting arm is formed with a gradually tapering upper face to its juncture with the moistener pad end thereof.

14. A moistener member according to claim 12, wherein said mounting arm is formed with recesses also on the upper and lower faces thereof.

15. A moistener member according to claim 12,
further including a plurality of ribs formed on its underface defining said moistener pad end thereof, and a liquid passageway leading through the mounting arm to said ribbed underface for conducting the moistening liquid thereto.

* * * * *